(12) United States Patent
Sinnaya et al.

(10) Patent No.: US 8,418,247 B2
(45) Date of Patent: Apr. 9, 2013

(54) INTRUSION DETECTION METHOD AND SYSTEM

(75) Inventors: Anula Sinnaya, Colombes (FR); Samuel Dubus, Nozay (FR); Laurent Clevy, Nozay (FR); Antony Martin, Nozay (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/733,057

(22) PCT Filed: Sep. 19, 2008

(86) PCT No.: PCT/EP2008/062505
§ 371 (c)(1),
(2), (4) Date: May 3, 2010

(87) PCT Pub. No.: WO2009/037333
PCT Pub. Date: Mar. 26, 2009

(65) Prior Publication Data
US 2010/0287615 A1    Nov. 11, 2010

(30) Foreign Application Priority Data

Sep. 19, 2007    (EP) ..................... 07291115

(51) Int. Cl.
*G06F 11/00*    (2006.01)
*G08B 23/00*    (2006.01)

(52) U.S. Cl.
USPC .................. 726/23; 726/22; 726/24; 726/25

(58) Field of Classification Search ........... 726/1, 22–25
See application file for complete search history.

(56) References Cited

U.S. PATENT DOCUMENTS 6,311,274 B1 * 10/2001 Day ............................... 726/22
(Continued)

OTHER PUBLICATIONS

Dingbang Xu et al: "Alert Correlation through Triggering Events and Common Resources" Computer Security Applications Conf., 2004. 20th Annual Tucson, AZ USA Dec. 6-10, 2004. pp. 360-369.*

(Continued)

*Primary Examiner* — Philip Chea
*Assistant Examiner* — Shanto M Abedin
(74) *Attorney, Agent, or Firm* — Carmen Patti Law Group, LLC

(57) ABSTRACT

A technique is provided for detecting unauthorized use or abnormal activities of a targeted system of a network. The technique includes a comparison of captured data that relates to a targeted system with attack signatures to generate a security alert when the captured data and an attack signature match, a comparison of assurance metrics data from a monitored targeted perimeter with assurance references to generate assurance information when the assurance metrics data and an assurance reference match, a generation of a verified security alarm when the security alert and associated preconditions match a corresponding assurance information, a filtering of the security alert when no match has been found between the associated retrieved preconditions and the corresponding assurance information, and an emitting of a non verified security alert when no preconditions have been retrieved for the security alert and/or no assurance reference corresponding to the preconditions has been defined.

5 Claims, 1 Drawing Sheet

U.S. PATENT DOCUMENTS

| | | | |
|---|---|---|---|
| 7,203,962 B1 | 4/2007 | Moran | |
| 7,735,141 B1* | 6/2010 | Noel et al. | 726/25 |
| 8,201,257 B1* | 6/2012 | Andres et al. | 726/25 |
| 2004/0255157 A1* | 12/2004 | Ghanea-Hercock | 713/201 |
| 2005/0229253 A1* | 10/2005 | Chawla et al. | 726/23 |
| 2006/0031938 A1* | 2/2006 | Choi | 726/25 |
| 2006/0048228 A1* | 3/2006 | Takemori et al. | 726/22 |
| 2006/0143710 A1* | 6/2006 | Desai et al. | 726/23 |
| 2006/0150248 A1* | 7/2006 | Ross et al. | 726/22 |
| 2006/0156398 A1* | 7/2006 | Ross et al. | 726/22 |
| 2011/0197278 A1* | 8/2011 | Chow et al. | 726/24 |

OTHER PUBLICATIONS

Lingyu Wang et al: "Using attack graphs for correlating, hypothesizing, and predicting intrusion alerts", Computer Communications 29 (2006) 2917-2933, 2006 Elsevier B.V.*

Yan Zhai et al: "Reasoning About Complementary Intrusion Evidence" Computer Security Applications Conference, 2004. 20th Annual Tucson, AZ, USA Dec. 6-10, 2004, pp. 39-48.

* cited by examiner

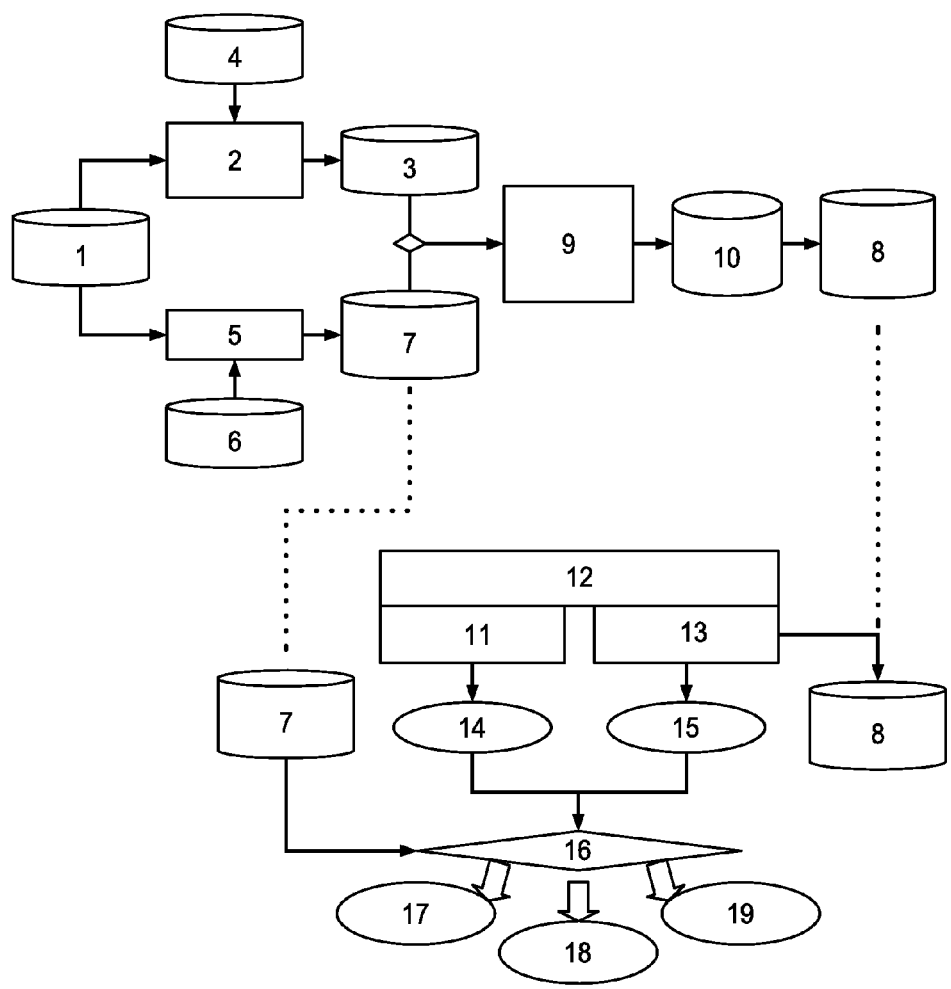

INTRUSION DETECTION METHOD AND SYSTEM

FIELD OF THE INVENTION

The invention relates generally to the field of communication systems e.g. IP networks, and more particularly to systems and methods for detecting intrusion in such communication systems.

BACKGROUND OF THE INVENTION

The rapid growth of networks in information systems has resulted in the increasing attention to IDS (Intrusion Detection Systems)—such as NIDS (Network Intrusion Detection Systems), HIDS (Host Intrusion detection system)- and NIPS (Network Intrusion Prevention Systems), NIPS combining both firewall and NIDS.

Computer networks have to be protected against DoS (Denial of Service) attacks, unauthorized disclosure or manipulation of information and the modification or destruction of data. In the meantime, the availability, confidentiality and integrity of critical information systems have to be provided.

It is reported that there have been 10,000 new viruses or variants of existing viruses in the year 2004 and at least one new attack spotted every hour (Kay, "*Low volume viruses: new tools for criminals*", Network Secur. 6, 2005, pp. 16-18). In 2001, the Code Red worm propagated to over 359,000 Internet hosts in less than 14 hours (Moore et al, "*Code Red: a case study on the spread and victims of an internet worm*", Proceeding of the second ACM Internet measurement workshop, 2002). In 2003, the SQL Slammer worm propagates to over 75,000 hosts in less than 30 minutes, 90% of which were infected within 10 minutes (Moore et al, "*The spread of the sapphire/slammer worm technical report*" CAIDA technical report, 2003). In 2002, a US federal bureau of investigation survey reported that the average cost of a successful attack by a external hacker is 56,000 USD, the average cost of a successful insider attack being reported at 2.7 million USD. (Power "2002 *CSI/FBI computer crime and security survey*" Computer security issues and trends, vol VIII, n°1, spring 2002).

IDS conventionally designate some software with the functions of detecting, identifying and responding to unauthorized or abnormal activities on a target system.

IDS have traditionally been centralized in design, centralized IDS being typically installed at a choke point of the network, e.g. the network service provider gateway, and operating in a standalone mode with centralized applications physically integrated within a single processing unit. Distributed IDS also exists, consisting of multiple sensors deployed on different areas of a large network, all of which ultimately report to a central server that aggregates the information and processes it.

The purpose of IDS is to distinguish between intruders and normal users. The goal of the IDS is to provide a mechanism for the detection of security violations either in real time or batch mode. Violations are initiated either by outsiders attempting to break into a system, or by insiders attempting to misuse their privileges.

The major functions performed by IDS are: monitoring and analyzing user and system activities, assessing the integrity of critical system or data files, recognizing activity patterns reflecting known attacks, responding automatically to detected activity and reporting the outcome of the detection process.

Intrusion detection can be divided into three categories based on the detection method: misuse detection, anomaly detection and data mining. Hybrid intrusion methods are also known, combining two approaches at the same time. Known as KDD-99, a labeled data set for comparing detection methods has been provided by the International Knowledge Discovery and Data Mining Tools Competition.

Misuse detection works on searching for the traces or patterns of well known attacks. Misuse detection systems try to match computer activity to stored signatures of known exploits or attacks. It uses a priori knowledge on attacks to look for attack traces. In other words, misuse detection refers to techniques that use patterns of known intrusions or weak spots of a system (e.g. system utilities that have the buffer overflow vulnerabilities) to match and identify intrusion.

The sequence of attack actions, the conditions that compromise a system's security, as well as the evidence (e.g. damage or system logs) left behind by intrusions can be represented by a number of general patterns matching models. These pattern matching models encode known signature as patterns that are then matched against audit data. Pattern matching frequently refers to fuzzy logic and artificial intelligence techniques such as neural networks.

For example NIDES (Next generation Intrusion Detection Expert System) uses rules to describe attack actions, STAT (State Transition Analysis Tool) uses state transition diagrams to model general states of the system and access control violations, and IDIOT (Intrusion Detection In Our Time) uses colored nets to represent intrusion signatures as sequences of events on the target system.

The key advantage of misuse detection systems is that once the patterns of known intrusions are stored, future instances of these intrusions can be detected efficiently and effectively.

However, newly invented attacks will likely go undetected, leading to unacceptable false negative error rates. Although misuse detection is assumed to be more accurate than anomaly detection, the major drawback of this technique is in creating a signature that encompasses most possible variations of intrusive and non intrusive activities.

Anomaly detection uses a model of the normal user or system behavior (user and system profile) and flags significant deviations from this model as potentially malicious. For example, the CPU usage and the frequency of system commands during a user login session are statistical parameters included in the user's profile. Deviation from a profile can be computed as the weight sum of the deviations of the constituent statistic.

The key advantage of anomaly detection systems is that they can detect unknown intrusion since they require non a priori knowledge about specific intrusion.

However, defining and maintaining normal profile is a nontrivial and error prone task, leading to sometimes unacceptable levels of false alarms.

Many recent approaches to IDS have utilized data mining techniques, e.g. CMDS (Computer Misuse Detection System), IDES (Intrusion Detection Expert System), MIDAS (Multics Intrusion Detection and Alerting System).

Data mining based IDS collect data from sensors such as e.g. those available from Cyber-Patrol Inc. Sensors monitor some aspect of a system, such as network activity, system calls used by user processes, and file system accesses. They extract predictive features from the raw data stream being monitored to produce formatted data that can be used for detection.

For a network based attack system, JAM uses frequent episode mining that generates the normal usage patterns of a specific node in the network. These patterns are used to build a base classifier that determines the abnormality of the network node. In order to guarantee correct classification, a sufficient amount of normal and abnormal data should be gathered for the learning phase of a classifier. A set of base classifiers can be used to build a meta classifier, since each base classifier monitors a different node of a network, an intrusion of the network can be detected by meta classifiers combining the results of its base classifier.

IDS are categorized according to the kind of audit source location they analyze.

Most IDS are classified as either a network based intrusion detection or a host based intrusion detection approach for recognizing and deflecting attacks.

When IDS look for these patterns in the network traffic, they are classified as network based intrusion detection.

Network based IDS analyze network packets that are captured on a network. As an example, SNORT is an open source network intrusion detection system, capable of performing real-time traffic analysis and packet logging on IP networks. SNORT can not generate intrusion patterns automatically. Experts must first analyze and categorize attack packets and hand code the corresponding patterns and rules for misuse detection. The number of patterns is increasing and is than 2100 in the current SNORT release.

When IDS look for attack signatures in the log files, they are classified as host based intrusion detection. Host based IDS system are installed locally on host machines. Host based IDS analyze host bound audit sources such as operating system audit trails, system logs, and application logs. In other words, host based IDS systems evaluate the activities and access to key servers upon which a Host based IDS has been placed.

The current IDS have contributed to identify attacks using historical patterns. But they have difficulty in identifying attacks using a new pattern or with no pattern. Using a rule based approach such as USTAT (State Transition Analysis Tool for Unix), NADIR (Network Anomaly Detection and Intrusion Reporter), and W&S (Wisdom and Sense), slight variations in a an attack sequence can affect the activity rule comparison to a degree that intrusion is not detected by the intrusion detection mechanism.

Two types of errors result in evoking inevitable IDS costs. These errors consist of false positive and false negative errors in IDS.

The false positive errors occur because the IDS sensor misinterprets normal packets or activities as an attack. False negative errors occur because an attacker is misclassified as a normal user.

It has been estimated that up to 99% of alerts reported by IDSs are not related to security issues (Julish "Using root cause analysis to handle intrusion detection alarm, PhD thesis University of Dortmund, 2003, page 1). Reasons for this include the following. Firstly, in many cases an intrusion differs only slightly from normal activities. Owing to harsh real time requirements, IDSs cannot analyze the context of all activities to the required extend. Secondly, writing signature for IDSs is a very difficult task. In some cases, it can be difficult to determine the right balance between an overly specific signature (which is not able to capture all attacks or their variations) and an overly general one (which recognizes legitimate actions as intrusions). Thirdly, actions that are normal in certain environments may be malicious in others. Fourthly, assuming that one million packets containing twenty packets of intrusions are analyzed per day, a perfect detection rate of 1.0 and a very low false positive rate of the order of $10^{-5}$ is leading to ten false positives, i.e. a Bayesian detection rate of true positive of only 66%.

These false positive intrusion alerts are a crucial issue that curbs the evaluation and resolution of real intrusion incidents. This amount of false-positive has an important negative effect on any correlation process that follows intrusion alerts, whatever it is automatic or human-being based. Indeed, state of the art studies on intrusion detection have demonstrated that a huge amount of false-positive alert decreases drastically the performance of automatic correlation engines that try to link several alerts to detect multi-step complex attacks (Ning et al "Learning attack strategies from intrusion alert" ACM conference on computer and communications security, 2003).

If the correlation is performed by a human expert, a huge amount of false-positive alerts tends to distract him as he tries to detect dangerous attacks. This makes the finding of real intrusion more difficult.

To give a real world example, up to 10 Gigabytes of security logging can be generated daily by roughly 15 sensors. After correlation, about one hundred of alerts are transmitted daily to the security management system and after analysis by a human expert, only a ten of cases per day are considered as "look like dangerous".

Various solutions have been proposed to address the issue of intrusion alert false-positive reduction.

Most of those solutions relate to alert correlation. Correlation techniques can be classified in several categories. First, correlation means bring together several intrusion alerts relating to the same dangerous event (i.e. the same attack). A second means is bringing together several intrusion alerts relating to several dangerous events in order to determine if a complex attack is ongoing within the network.

Although instigators of alert correlation had first expected it could reduce the amount of false-positive alerts, it is now known that false-positive alerts curb the performance of common correlation engines (Ning et al "Learning attack strategies from intrusion alert" ACM conference on computer and communications security, 2003). Moreover, the correlation is already a computer time-consuming task that exposes a correlation system to DoS attacks by false-positive flooding.

Another approach to reduce the false-positive alerts consists in using contextual information on the infrastructure (e.g. network topology, known existing vulnerabilities) to determine if the attack has some chances to be successful and figures a real intrusion possibility. This technique relates to the concept of alert verification. In literature, two kinds of alert verification exist, active and passive.

Active alert verification uses information gathered after an alert has been raised to determine if the attack is successful, while passive verification uses a priori information of the infrastructure security to determine if the attack has a chance to be successful.

Current passive verification systems use static knowledge of the infrastructure security and do not measure it. This can lead to misclassification of alerts as false-positive and thus, creates false-negatives (alert is not generated for a real attack and is classified as false-positive).

On the other side, current active alert verification systems are based on a posteriori (after the intrusion alert has been issued) gathering of information that may prove the success of the attack (i.e. a signature of the intrusion, compared to an attack signature commonly used by IDS/IPS). In that case, the main issue is that the verification could occur after the attacker has covered the track of its intrusion.

SUMMARY OF THE INVENTION

In view of the foregoing and other problems of the conventional systems and methods, it is one object of the present invention to provide an efficient method for filtering false positive alerts in an intrusion detection system.

In a first aspect of the present invention, an intrusion detection method for detecting unauthorized use or abnormal activities of a targeted system of a network is provided, this method comprising the following steps:

creating defined preconditions for each vulnerability related to the targeted system and/or for each attack that exploits one or several vulnerabilities;

creating assurance references corresponding to said defined preconditions and considering the target perimeter capturing data related to the targeted system, e.g. network data, log like data, this capture step being advantageously made in real time comparing captured data with attack signatures for generating at least one security alert when captured data and at least one attack signature match capturing assurance data from monitoring of the targeted perimeter for defining assurances references corresponding to said defined preconditions comparing data issued from assurance monitoring of the targeted perimeter (e.g. configuration files of infrastructure elements) with assurance references for generating assurance information when said data issued from assurance monitoring and at least one assurance reference match retrieving the preconditions of the generated security alert checking if assurance information corresponding to said preconditions has been retrieved generating a verified security alarm when generated security alert and its retrieved precondition match with at least one corresponding assurance information filtering said security alert when no match has been found between its retrieved preconditions and at least one corresponding assurance information emitting a non verified security alert when no preconditions have been retrieved for this alert and/or no assurance reference corresponding to said preconditions has been defined.

The definition of preconditions could be made using an attack language description such as Lambda. Example of attack description using the Lambda language could be found e.g. in Cuppens et al "*Alert Correlation in a Cooperative Intrusion Detection Framework, Proceedings of the* 2002 *IEEE Symposium on security and privacy.*

"Preconditions for each vulnerability" designate means allowing the unauthorized or abnormal use of a targeted system that exploits one vulnerability. In other words, if a system weakness (e.g. a code error) can be exploit for an attack then such weakness is a vulnerability.

"Preconditions for each attack" designate preconditions for attack having a signature and exploiting several vulnerabilities. In other words, if various system formal defects (e.g. code errors) can be used for an attack that has a signature, then these formal defects are vulnerabilities.

Advantageously, after detection of vulnerabilities alerts (e.g. CERT alerts), an enrichment process is made, said enrichment process comprising definition of assurance references to be monitored for each of said new vulnerabilities or attack exploiting one or several vulnerabilities; definition of security events for each of said new vulnerabilities or attack exploiting one or several vulnerabilities and definition of preconditions for said security events.

"Attack exploiting one or several vulnerabilities" include a combination of at least one new vulnerability and already processed vulnerabilities.

Advantageously, a translation of the vulnerabilities alerts in a correlation engine understandable language, using an automatic algorithm.

In another aspect of the invention, an intrusion detection system for detecting unauthorized use or abnormal activities of a targeted system of a network is provided, this system comprising means for creating defined preconditions for each vulnerability related to the targeted system and/or for each attack that exploits one or several vulnerabilities means for creating assurance references corresponding to said defined preconditions and considering the targeted perimeter a sniffer for capturing data related to the targeted system means for comparing captured data with attack signatures for generating at least one security alert when captured data and at least one attack signature match means for capturing assurance data from monitoring the targeted perimeter means for comparing assurance data issued from assurance monitoring of the targeted perimeter with assurance references and for generating assurance information when said data issued from assurance monitoring and at least one assurance reference match means for retrieving the preconditions of the generated security alert means checking if assurance information corresponding to said preconditions has been retrieved said system generating a verified security alarm when generated security alert and its retrieved precondition match with at least one corresponding assurance information said system filtering said security alert when no match has been found between its retrieved preconditions and at least one corresponding assurance information said system emitting a non verified security alert when no preconditions have been retrieved for this alert and/or no assurance reference corresponding to said preconditions has been defined.

In another aspect of the invention, it is provided a computer program product comprising a computer usable medium having control logic stored therein for causing a computer to detect unauthorized use or abnormal activities of a targeted system of a network, said control logic comprising:

first computer readable program code for creating defined preconditions for each vulnerability related to the targeted system and/or for each attack that exploit one or several vulnerabilities second computer readable program code for creating assurance references corresponding to said defined preconditions and considering the targeted perimeter third computer readable program code for capturing data related to the targeted system fourth computer readable program code for comparing captured data with attack signatures for generating at least one security alert when captured data and at least one attack signature match fifth computer readable program code for capturing assurance data from monitoring of the targeted perimeter sixth computer readable program code for comparing assurance data issued from assurance monitoring of the targeted perimeter with assurance references for generating assurance information when said data issued from assurance monitoring and at least one assurance reference match seventh computer readable program code for retrieving the preconditions of the generated security alert eighth computer readable program code for checking if assurance information corresponding to said preconditions has been retrieved said computer program product generating a verified security alarm when generated security alert and its retrieved precondition match with at least one corresponding assurance information filtering said security alert when no match has been found between its retrieved preconditions and at least one corresponding assurance information emitting a non verified security alert when no preconditions have been retrieved for this alert and/or no assurance reference corresponding to said preconditions has been defined.

The above and other objects and advantages of the invention will become apparent from the detailed description of preferred embodiments, considered in conjunction with the accompanying drawings.

BRIEF DESCRIPTION OF THE DRAWINGS

FIG. 1 is a schematic view of a intrusion detection system according to the present invention.

DESCRIPTION OF PREFERRED EMBODIMENTS

An information flow (assurance view of the vulnerability) starts with a vulnerability database 1, which may be built by CERTs (Computer Emergency Response Team), or by an expert from his knowledge and information issued by CERTs.

A conversion/enrichment module 2 is able to define assurance references for metrics 3, metrics being monitoring probes that are in charge of observing a targeted perimeter in order to check whether a security policy has been applied and also to verify that security mechanisms are up and running according to said policy.

Considering the scope of the measurable data 4 for security assurance and the CERT vulnerability database 1, the module 2 defines assurance references 3 that will be monitored by the metrics for security assurance purpose. Security Assurance, also called SCC (Security Compliancy and Conformity) is the grounds for confidence that an entity meets AR (Assurance References) of an organization.

This process is able to generate a priori assurance references as soon as vulnerabilities are published.

From the CERT database 1, another information flow (security view of the vulnerability) is forwarded to an enrichment module 5 for security correlation purpose.

The module 5 uses as an input an IDS/IPS/probes signature database 6 to define pre-conditions and post-conditions 7 related to each CERT vulnerability.

Both CERT based conversion/enrichment process 2, 5 can be done by using an automatic algorithm, CERT alerts being translated into a correlation engine understandable language, or by manual translation of the CERT alerts.

The definition of preconditions could be made using an attack language description such as Lambda. Example of attack description using the Lambda language could be found e.g. in Cuppens et al "*Alert Correlation in a Cooperative Intrusion Detection Framework, Proceedings of the* 2002 *IEEE Symposium on security and privacy*, http://4Lx.free.fr/articles/CMO2.pdf.

This conversion/enrichment process can be standardized at IETF (Internet Engineering Task Force) for instance at the Intrusion Detection Working Group.

The module 8 looks for assurance references 3 that address security events pre-conditions 7. If some security events pre-conditions 7 are not covered by assurance references database 3, the module 9 defines them into database 10. This helps having a complete set of assurance references that will be used for false-positive reduction.

Some security equipments 11, like IDS or firewalls, are supervising a targeted perimeter 12. At the same time the security assurance metrics 13 are also supervising the same targeted perimeter 12.

The security software or equipments 11 are generating security alerts 14 based on known attack signatures, whereas assurance metrics 13 are generating assurance information 15 based on Assurance references database 3. The security alerts 14 and the assurance information 15 are sent to a Verification module 16.

As soon as a security alert 14 is generated, the verification module 16 retrieves the pre-conditions of the specific security alert 14 and checks if corresponding assurance information has also been retrieved.

If a security alert and its pre-condition(s) match with one or more assurance information, the alert is considered to be trustable and a verified security alarm 17 is generated.

If an existing assurance metric, that monitors a precise perimeter, provides no assurance information whereas a security alert is emitted for that perimeter, the alert is considered to be not trustable and is filtered 18.

Finally, if the security alert is not known in the security alert database and/or no assurance metric exists for this alert, a non-verified security alert 19 is emitted. It is possible to inform the SOC (Security Operation Center, e.g. Threat Management Center of Alcatel-Lucent) that will install later a metric that will monitor and give security assurance feedback.

Security alerts emitted by IDS and/or firewall are filtered in an intermediate module (Verification Module 16) and the quantity of false positive are decreased.

By enriching existing alert verification with the new kind of Security Assurance information, the proposed invention will reduce the false positive rate.

Example

A targeted system is configured to handle SSH (Secure Shell) connections. The login is, by default, set to use certificate based SSH authentication and this information is stored in the security assurance policy.

The corresponding security assurance metric regularly checks if the SSH authentication is still correctly working.

A brute force attack is detected by the IDS. This attack will succeed only if the pre-condition(s) is (are) verified. The precondition is that the SSH connection must be set with password authentication.

When this alert arrives at the Verification module, this one checks if a "SSH authentication configuration has changed" assurance information (from certification authentication to password authentication) has been emitted. If it is the case, the security alert is considered to be relevant regarding the assurance context and a verified security alert is emitted. On the opposite, if no corresponding assurance information has been retrieved, the security alert is considered to be not relevant and is filtered.

False positive alerts are known to reduce the performance, accuracy and relevance of the correlation processes. They are known to curb the overall performance of intrusion alert correlation engines, but they are also a major issue for security experts that perform manually the analysis of security events.

The present invention enables to reduce the occurrence of false-positive intrusion alerts by using security assurance (i.e.

configuration conformity measurements) to filter (i.e. verify) intrusion alerts (generated by Commercial Off The Shelf COTS IDS/IPS).

This will allow security experts and intrusion correlation engines to focus on real alerts, and thus improve the ability to understand sooner and accurately the real danger of an attack.

Moreover, the assurance references are updated with respect to detectable IDS/IPS event's pre-conditions, by extracting and enriching the information of CERT-like alerts. This stage can be standardized at IETF in the Intrusion Detection Working Group.

The value of the present invention over the passive verification approach is that the vulnerabilities of the infrastructure is continuously measured (active and a priori approach).

Compared to a posteriori approach, the present invention reduces drastically the possibility for an attacker to trick the verification system by covering his track before the verification process has collected clues of the intrusion success. In other words, the present invention produces less false negatives.

Moreover, in the present invention solution, the verification is performed before the attack has occurred. True alerts are raised sooner than with a posteriori verification, in which clues of the intrusion are gathered after the attack has occurred. Indeed, the gathering process is time-consuming.

The invention claimed is:

1. An intrusion detection method for detecting unauthorized use or abnormal activities of a targeted system of a network, comprising the steps of:
   creating defined preconditions for each vulnerability related to the targeted system and/or for each attack that exploit one or several vulnerabilities;
   creating assurance references that correspond to said defined preconditions and a targeted perimeter;
   capturing data related to the targeted system;
   comparing said captured data with attack signatures to generate at least one security alert when said captured data and at least one attack signature match;
   capturing assurance metrics data from monitoring of the targeted perimeter;
   comparing said assurance metrics data with assurance references to generate assurance information when said assurance metrics data and at least one assurance reference match;
   retrieving the preconditions of said generated at least one security alert;
   checking when assurance information that corresponds to said preconditions has been retrieved;
   generating a verified security alarm when said generated at least one security alert and associated retrieved precondition match with at least one corresponding assurance information;
   filtering said generated at least one security alert when no match has been found between said associated retrieved preconditions and said at least one corresponding assurance information; and
   emitting a non verified security alert when no preconditions have been retrieved for said generated at least one security alert and/or no assurance reference corresponding to said preconditions has been defined.

2. The method according to claim 1, wherein after detection of vulnerabilities alerts, an enrichment process is made, said enrichment process comprising definition of assurance references to be monitored for each new vulnerability or attack exploiting one or several vulnerabilities.

3. The method according to claim 2, further comprising the step of translating the vulnerabilities alerts in a correlation engine understandable language.

4. The method according to claim 1, wherein the generating the verified security alarm step is performed before the attack has occurred.

5. A non-transitory computer-readable medium storing computer executable instructions for performing steps, comprising:
   creating assurance references that correspond to defined preconditions and a targeted perimeter;
   comparing captured data that relates to a targeted system with attack signatures to generate at least one security alert when said captured data and at least one attack signature match;
   capturing assurance metrics data from monitoring of the targeted perimeter;
   comparing assurance metrics data from a monitored targeted perimeter with assurance references to generate assurance information when said assurance metrics data and at least one assurance reference match;
   generating a verified security alarm when said generated at least one security alert and associated retrieved preconditions match at least one corresponding assurance information;
   filtering said generated at least one security alert when no match has been found between said associated retrieved preconditions and said at least one corresponding assurance information; and
   emitting a non verified security alert when no preconditions have been retrieved for said generated at least one security alert and/or no assurance reference corresponding to said preconditions has been defined.

* * * * *